United States Patent

Xiao

[19]

[11] Patent Number: 6,028,506
[45] Date of Patent: Feb. 22, 2000

[54] CAR ALARM TRANSMITTING AND PAGING SYSTEM

[76] Inventor: Wei Hao Xiao, 19540 Rogan Ct., Rowland Heights, Calif. 91748

[21] Appl. No.: 08/958,265

[22] Filed: Oct. 27, 1997

[51] Int. Cl.[7] .................................................. B60R 25/10
[52] U.S. Cl. ........................ 340/426; 340/539; 455/38.4; 455/458
[58] Field of Search ................................ 340/426, 425.5, 340/427, 428, 429, 539, 573; 455/458, 38.2

[56] References Cited

U.S. PATENT DOCUMENTS

| | | | |
|---|---|---|---|
| 4,978,946 | 12/1990 | Nordholm | 340/573 |
| 5,049,867 | 9/1991 | Stouffer | 340/426 |
| 5,132,660 | 7/1992 | Chen et al. | 340/428 |
| 5,140,308 | 8/1992 | Tanaka | 340/539 |
| 5,175,868 | 12/1992 | Yasuoka | 455/38.2 |
| 5,216,407 | 6/1993 | Hwang | 340/426 |
| 5,223,844 | 6/1993 | Mansell et al. | 342/357 |
| 5,334,974 | 8/1994 | Simms et al. | 340/990 |
| 5,365,217 | 11/1994 | Toner | 340/539 |
| 5,432,495 | 7/1995 | Tompkins | 340/429 |
| 5,606,307 | 2/1997 | Kuan | 340/426 |
| 5,739,748 | 4/1998 | Flick | 340/426 |

*Primary Examiner*—Daniel J. Wu

[57] ABSTRACT

A car alarm transmitting and paging system comprising an improvement of an existing conventional phone pager and transmitter which allows the pager to be used dually as a phone pager and also as an alarm activation notification device, wherein the transmitter is used in conjunction with a conventional vehicle alarm to transmit the notification of alarm activation to the carrier of the modified pager. Because the modified pager still accepts incoming calls and operates as a conventional pager, this invention obviates the necessity of owning and carrying two separate pagers, one for normal pager use, and the other for notification of alarm activation.

1 Claim, 1 Drawing Sheet

CAR ALARM TRANSMITTING AND PAGING SYSTEM

BACKGROUND OF THE INVENTION

1. Field of the Invention

The present invention relates generally to a car alarm transmitting and paging system and particularly to improvements to an existing conventional car alarm transmitter and conventional phone pager which allow the pager to be used dually as a pager and also as an alarm activation notification device.

2. Description of the Prior Art

The prior art has provided car alarm systems with various functions, methods, layouts, and constructions to combat the auto-thefts and corresponding climbs in insurance rates. The prior art can be broadly classified as localized car alarm systems and car alarm systems with tracking and locating capabilities. Localized car alarms such as disclosed by U.S. Pat. No. 5,132,660 to Chen and Shee and U.S. Pat. No. 5,049,867 to Stouffer activate the alarm system when the vehicle is intruded upon. However, if the owner of the vehicle or a security personnel is not in the vicinity, there is a high likelihood of the vehicle being stolen because a means of notifying the owner of the vehicle alarm activation in real time is not provided. Consequently, most people are not willing to take action against theft if the vehicle being stolen is not theirs. Moreover, with the increasing number of false alarms, an activated alarm is often ignored. In summary, this type of security system does not provide a means of alerting the owner of alarm activation in real time regardless of the location of the vehicle with respect to the owner. Car alarm systems with tracking and locating capabilities as disclosed by U.S. Pat. No. 5,223,844 to Mansell and Riley does not provide a means of notifying the owner of car alarm activation in real time.

U.S. Pat. No. 5,432,495 to Tompkins discloses a beeper controlled auto security system in which a vehicle disabling device such as an ignition kill switch is selectively activated either by a hand held of transmitter unit or a beeper paging system satellite transmission initiated by a telephone call which may be at a very remote location from the vehicle. U.S. Pat. No. 5,432,495 does not disclose an improvement to an existing commercial phone pager to allow the pager to be used as an alarm activation device, as the present invention does. Moreover, the beeper taught in this invention cannot operate dually as a conventional phone beeper and an alarm activation device.

U.S. Pat. No. 5,140,308 to Tanaka discloses a mobile radio system which has an upward and downward control channel for controlling a call-out transmitted from a mobile terminal station, independently from a communication channel. This invention includes a portable receiver which notifies the user of alarm activation, but the receiver does not work dually as a conventional phone pager.

U.S. Pat. No. 5,334,974 to Simms et al. discloses a fully automatic personal security system which combines the advantages of worldwide LORAN-C or GPS navigation with the substantially worldwide communication capabilities of a cellular telephone or communication satellite. This invention does not incorporate the use of a conventional phone pager and thus does not disclose a dually functional pager which operates both as a conventional phone pager and also as a notification device of alarm activation.

U.S. Pat. No. 5,365,217 to Toner discloses a method and apparatus for monitoring safety of persons within a predetermined area which includes personal transmitters for wirelessly transmitting distress signals. These transmitters, however, are not conventional phone pagers and thus do not function dually as a pager and an alarm notification device.

The present invention significantly improves upon the prior art by providing a car alarm system whereby an existing in-vehicle car alarm system and a commonly available phone pager are utilized in conjunction with the present invention to provide a real time car alarm activation notice to the user even though the user may not be in the vicinity of the car and to void the necessity of the user having to carry separate pagers for the car alarm system and for personal use.

Accordingly, the primary object of the present invention is to provide an improvement to a conventional phone pager and a transmitter used in conjunction with a conventional car alarm in order to provide the carrier with real time notification of alarm activation.

A further object of the present invention is to provide an alarm system which reduces the amount of pagers or notification devices a carrier must hold in order to have access to adequate notification.

SUMMARY OF THE INVENTION

The present invention relates generally to a vehicle security system and particularly to the improvement of an existing conventional phone pager which allows the pager to be used dually as a phone pager and also as an alarm activation notification device, wherein a transmitter is used in conjunction with a conventional vehicle alarm to transmit the notification of alarm activation to the carrier of the modified pager. Because the modified pager still accepts incoming phone pages and operates as a conventional pager, this invention obviates the necessity of owning and carrying two separate pagers, one for normal pager use, and the other for notification of alarm activation.

It is a common practice of automobile thieves to disconnect the car alarm in order to inconspicuously steal an automobile. Consequently, the present invention provides a car alarm system which can still notify the owner of attempted theft when the transmitting antenna is interfered with or broken.

These together with other objects of the invention are explained clearly in the claims annexed to and forming a part of this disclosure. For a better understanding of the invention, its operating advantages and the specific objects attained by its use, reference should be made to the accompanying drawings and descriptive matter in which there are illustrated preferred embodiments of the invention.

BRIEF DESCRIPTION OF THE DRAWINGS

For a better understanding of the principle and nature of the present invention, reference should be made to the following detailed description taken in connection with the accompanying drawings in which.

DETAILED DESCRIPTION OF THE PREFERRED EMBODIMENT

The present invention comprises a transmitter 100 and a modified conventional pager 200. Because sensors are normally used to trigger the activation of a car alarm, when a sensor of a conventional car alarm is activated, the transmitter 100 transmits a signal to the modified conventional pager 200 which notifies the user of the activation of the alarm.

Figure 1:
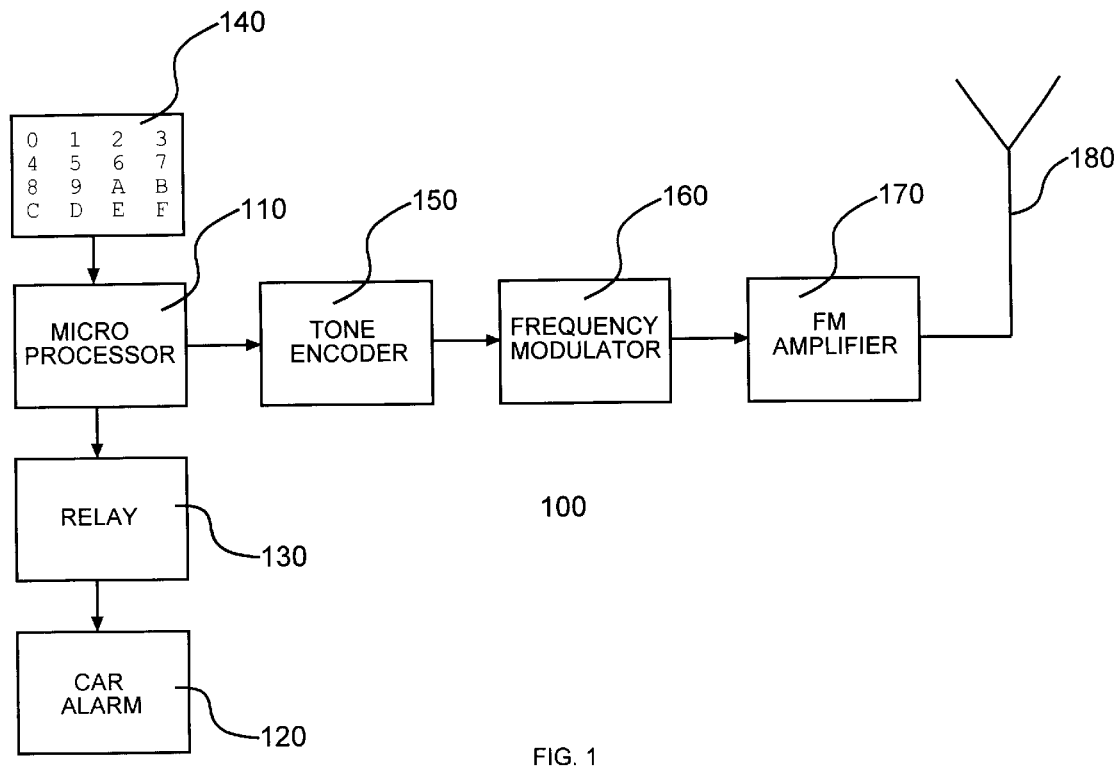
FIG. 1 is a schematic diagram of the transmitting device used in conjunction with a conventional alarm system.

Referring to FIG. 1, the transmitter 100 comprises a microprocessor 110, wherein a relay 130 connects the sensors of the alarm system 120 to the microprocessor 110. The user's digital ID along with "safe" and "warning" digital alarm status codes are programmed into the microprocessor 110, and the microprocessor sends the appropriate digital alarm status code to the tone encoder 150, wherein the tone encoder 150 converts the digital code into tone frequencies which in turn are converted into radio frequencies by the frequency modulator 160. The radio frequencies are then sent to the FM amplifier 170 which are then broadcasted via an antenna 180. A keypad 140 is provided to input digital code data into the microprocessor 110.

The transmitter frequencies and coding format of the transmitter are the same as those used by conventional phone paging systems so that the phone pager can receive signals from the vehicle transmitter. For instance, the tone encoder translates the digital code from the microprocessor into a sequence of corresponding tone signal under the format of the local communication regulation. In the U.S., it is called Metropage. For example, the area code "818" is represented by three tone signals of "1728 Hz", "741 Hz", and "1728 Hz". The radio frequencies, however, will be different according to the pager company the user is with. Furthermore, the power of the transmitter is strong enough to reach the pager carrier even when the carrier is in a difficult area for radio communications. But the power should be limited to a certain level so that it will not violate FCC regulations. For the best results, this alarm is to be applied as a license free electronic device.

Figure 2:
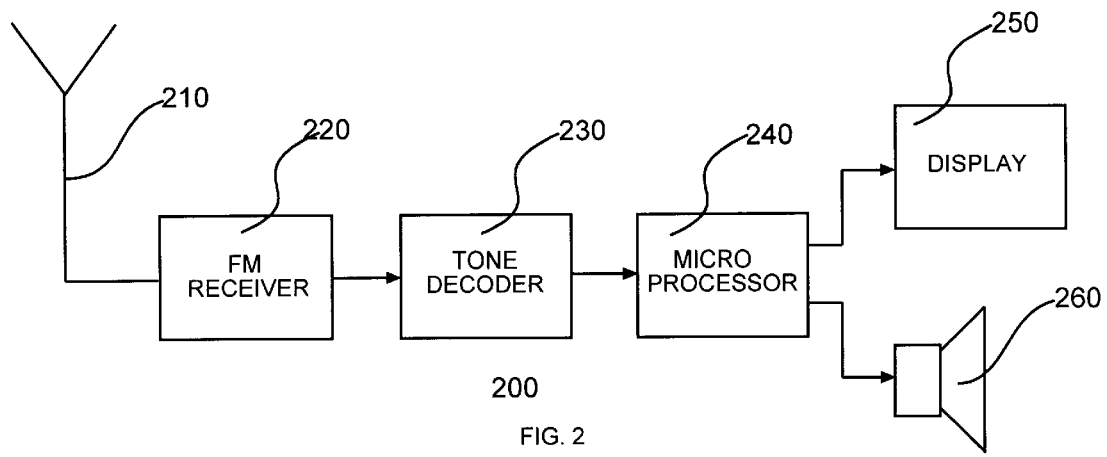
FIG. 2 is a schematic diagram of the modified conventional phone pager.

FIG. 2 is a schematic diagram of a conventional phone pager. However, it is also the diagram for the modified conventional pager 200 of the present invention, since the modification only involves the improvement of the microprocessor inside the pager. Referring to FIG. 2, the modified conventional pager 200 comprises an antenna 210, a FM receiver 220, a tone decoder 230, a microprocessor 240, a display 250, and an audio output 260. The modified conventional pager 200 differs from a conventional pager only in that the microprocessor 240 is reprogrammed in the unique way disclosed in this invention in order to receive and recognize multiple paging signals, namely, the "safe" and "warning" codes stored within the microprocessor 110 of the transmitter 100 and the signal sent from the phone paging station.

When the car alarm system 120 is activated and the sensors of the alarm system 120 do not detect any theft (the sensors may be motion detectors, vibration detectors, or any other detection devices commonly used in the art of alarm systems), the relay 130 of the alarm 120 induces the microprocessor 110 to send a "safe" digital alarm status code to the tone encoder 150, which then is broadcasted via the antenna 180.

The receiving antenna 210 of the modified phone pager 200 receives the "safe" digital alarm frequency via the FM receiver, and this frequency is converted to digital code through the tone decoder 230. The microprocessor 240 then analyzes the "safe" code, and informs the user of the status of the alarm via the display 250 and/or the audio output 260, or simply doesn't display anything to conserve batteries. The transmitter 100 sends these messages periodically to constantly inform the user of the status of the alarm. Therefore, the microprocessor 240 may be programmed in a manner which allows the display and/or audio output do not respond to a "safe" status code received from the transmitter 100.

When the car alarm system 120 is activated and the sensors of the alarm system 120 detect theft, the relay 130 of the alarm 120 induces the microprocessor 110 to send a "warning" digital alarm status code to the tone encoder 150, which then is broadcasted via the antenna 180. The receiving antenna 210 of the modified phone pager 200 receives the "warning" digital alarm signal via the FM receiver, and this signal is converted to digital code through the tone decoder 230. The microprocessor 240 then analyzes the "warning" code, and informs the user of the status of the alarm via the display 250 and/or the audio output 260.

In the event that thieves break the antenna 180 of the transmitter 100 in order to stop transmission of the "warning" code to the pager 200, the pager 200 does not receive the typical "safe" code, and thus a resulting "warning" code is generated in the microprocessor 240 of the pager 200, and is consequently shown on the display 250 and through the audio output 260. This prohibits thieves from preventing the transmission of the "warning" code to the user. Thus, whether the sensors of the car alarm 120 are triggered or the transmitting antenna 180 is broken by potential thieves, the user is notified via the pager 200.

Most pagers in the current market have selecting means which allow the user to select between different modes and/or options. The microprocessor in the modified phone pager of this invention is reprogrammed so that the user may toggle between alarm mode and normal pager mode. In the alarm mode, the pager responds both to the signal from the vehicle transmitter as well as the signal from the phone paging station. In normal mode, the pager only responds to the signal from the phone paging station. "The transmitter can further include a user selectable means of toggling the periodic sending of the digital codes."

What is claimed as being new and therefore desired to be protected by letters patent by the United States is as follows:

1. A multi-purpose car alarm transmitting and paging system utilizing a conventional pager for both conventional phone paging and car alarm activation notification, comprising:

a) a transmitter connected to a conventional car alarm via a relay, wherein said relay is activated when said conventional car alarm is activated, wherein said relay is not activated when said conventional car alarm is not activated, wherein said transmitter comprises:

1) a microprocessor which periodically sends digital codes according to information received from said relay;

(a) a digital "safe" code stored in said microprocessor, wherein said "safe" code is sent to a tone encoder if said relay is not activated;

(b) a digital "warning" code stored in said microprocessor, wherein said "warning" code is sent to said tone encoder if said relay is activated;

(c) a means of inputting other digital codes into said microprocessor;

(d) a user selectable means of toggling the periodic sending of said digital codes;

2) said tone encoder connected to said microprocessor, wherein said tone encoder converts said digital codes into tone signals, wherein said tone signals are compatible with local phone paging systems;

3) a frequency modulator connected to said tone encoder, wherein said frequency modulator converts said tone signals into radio frequencies, wherein said radio frequencies are compatible with local phone paging systems;
4) a power amplifier connected to said frequency modulator;
5) an antenna connected to said FM amplifier;
6) said transmitter having a small enough broadcasting range to conform to FCC regulations;

b) a modified phone pager which receives signals from both a conventional phone paging station and said transmitter, comprising:
1) an antenna;
2) a FM receiver connected to said antenna;
3) a tone decoder connected to said FM receiver, wherein said tone decoder converts said tone signals into digital codes;
4) a microprocessor connected to said tone decoder and a display;
   (a) said microprocessor able to recognize said "safe" and "warning" messages of said microprocessor of said transmitter;
   (b) said microprocessor also able to recognize incoming pages from said conventional phone paging station;
   (c) said microprocessor sending a "warning" message to said display and an audio output when a "warning" message is received from said transmitter;
   (d) said microprocessor not sending any message to said display and said audio output when a "safe" message is received from said transmitter;
   (e) said microprocessor sending a "warning" message to said display and said audio output when neither a "safe" nor a "warning" message is received from said transmitter;
5) said display wherein said microprocessor determines what is displayed on said display;
6) said audio output wherein said microprocessor determines whether said audio output is activated or deactivated;
7) said pager having a means to select between an alarm mode and a normal mode, wherein said alarm mode allows said pager to accept incoming pages as well as transmissions from said transmitter, wherein said normal mode allows said pager to accept only incoming pages.

\* \* \* \* \*